(12) United States Patent
Sugita et al.

(10) Patent No.: US 12,373,514 B2
(45) Date of Patent: Jul. 29, 2025

(54) OPTIMIZATION METHOD, INFORMATION PROCESSING APPARATUS, AND SYSTEM USING THE SAME

(71) Applicant: Hitachi, Ltd., Tokyo (JP)

(72) Inventors: Yusuke Sugita, Tokyo (JP); Takuya Okuyama, Tokyo (JP); Masanao Yamaoka, Tokyo (JP)

(73) Assignee: HITACHI VANTARA, LTD., Yokohama (JP)

( * ) Notice: Subject to any disclaimer, the term of this patent is extended or adjusted under 35 U.S.C. 154(b) by 928 days.

(21) Appl. No.: 17/399,091

(22) Filed: Aug. 11, 2021

(65) Prior Publication Data

US 2022/0308837 A1    Sep. 29, 2022

(30) Foreign Application Priority Data

Mar. 25, 2021   (JP) ................... 2021-051414

(51) Int. Cl.
  *G06F 17/11* (2006.01)
  *G06F 17/10* (2006.01)
(52) U.S. Cl.
  CPC .............. *G06F 17/11* (2013.01); *G06F 17/10* (2013.01)
(58) Field of Classification Search
  CPC ..................................................... G06F 17/11
  See application file for complete search history.

(56) References Cited

U.S. PATENT DOCUMENTS

2020/0401651 A1*   12/2020   Tamura .................... G06N 5/01
2021/0117188 A1    4/2021   Okuyama (Continued)

FOREIGN PATENT DOCUMENTS

WO    2019/216277 A1    11/2019

OTHER PUBLICATIONS

M. Hayashi, M. Yamaoka, C. Yoshimura, T. Okuyama, H. Aoki, and H. Mizuno, "Accelerator Chip for Ground-state Searches of Ising Model with Asynchronous Random Pulse Dhayashi2016-acceleratoristribution," International Journal of Networking and Computing, vol. 6, No. 2, pp. 195-221, 2016. (Year: 2016).*

(Continued)

*Primary Examiner* — Emily E Larocque
*Assistant Examiner* — Markus Anthony Villanueva
(74) *Attorney, Agent, or Firm* — MATTINGLY & MALUR, PC

(57) ABSTRACT

Provided is an optimization method including executing a ground state search for an interaction model by a ground state search in a surrogate interaction model including D (D is a natural number of three or more) variable groups each having N continuous variables by using an information processing apparatus, the interaction model having a third-order or higher-order energy function including N (N is a natural number) continuous variables and discrete variables. The ground state search is executed based on simulated annealing. An interaction relation of the surrogate interaction model has a complete D-part graph structure. A coupling is set between i-th variable pairs in the respective variable groups of the surrogate interaction model. The information processing apparatus is operated to simultaneously update all variables of one variable group from among the D variable groups when performing a state transition in the surrogate interaction model.

4 Claims, 10 Drawing Sheets

(56) References Cited

U.S. PATENT DOCUMENTS

| | | | | |
|---|---|---|---|---|
| 2021/0192108 A1* | 6/2021 | Nambu | ................... | G06F 30/20 |
| 2022/0083315 A1* | 3/2022 | Goto | ......................... | G06F 7/02 |
| 2022/0405048 A1* | 12/2022 | Konoshima | .............. | G06N 7/01 |
| 2023/0169142 A1* | 6/2023 | Hattori | ..................... | G06N 5/01 |
| | | | | 708/200 |

OTHER PUBLICATIONS

Soderberg, Bo, and Henrik Jonsson. "Deterministic annealing and nonlinear assignment." arXiv preprint cond-mat/0105321 (2001). (Year: 2001).*

T. Okuyama, C. Yoshimura, M. Hayashi, and M. Yamaoka, "Computing architecture to perform approximated simulated annealing for ising models," in 2016 IEEE International Conference on Rebooting Computing (ICRC), Oct. 2016, pp. 1-8. (Year: 2016).*

T. Okuyama, M. Hayashi and M. Yamaoka, "An Ising Computer Based on Simulated Quantum Annealing by Path Integral Monte Carlo Method," 2017 IEEE International Conference on Rebooting Computing (ICRC), Washington, DC, USA, 2017, pp. 1-6, doi: 10.1109/ICRC.2017.8123652. (Year: 2017).*

C. Yoshimura, M. Hayashi, T. Okuyama, and M. Yamaoka, "Fpga-based annealing processor for ising model," in 2016 Fourth International Symposium on Computing and Networking (Candar), Nov. 2016, pp. 436-442. (Year: 2016).*

Samuel Burer et al., Non-convex mixed-integer nonlinear programming: A survey, Surveys in Operations Research and Mangement Science 17 (2012), pp. 97-106.

Endre Boros et al., On Quadratization of Pseudo-Boolean Functions, Internationals Symposium on Artificial Intelligence and Mathematics (ISAIM), Fort Lauderdale, FL, USA, Jan. 9-11, 2012.

* cited by examiner $s_1 = \{-1,1\}$ $s_2 = [-1,1]$

OPTIMIZATION METHOD, INFORMATION PROCESSING APPARATUS, AND SYSTEM USING THE SAME

BACKGROUND OF THE INVENTION

1. Field of the Invention

The present invention relates to an optimization method and an information processing apparatus.

2. Description of the Related Art

WO 2019/216277 A1 describes a method of efficiently performing a ground state search based on simulated annealing by converting an interaction relation of an Ising model having a second-order energy function into a complete bipartite graph structure.

S. Burer and A. N. Letchford: "Non-convex mixed-integer nonlinear programming: A survey", Surveys in Operations Research and Management Science 17, 97-106 (2012) is a survey paper of application cases and solutions regarding the mixed-integer nonlinear programming problem, and describes actual problems such as engineering and industry.

E. Boros and A. Gruber, "On quadratization of pseudo-Boolean functions", International Symposium on Artificial Intelligence and Mathematics (2012) describes a method of transforming a high-order interaction between binary variables into second-order interactions by introducing auxiliary variables.

SUMMARY OF THE INVENTION

Many physical phenomena and social phenomena can be represented by interaction models. The interaction model is defined by a plurality of nodes constituting the model, an interaction relation between nodes, and a bias for each node. Although various models have been proposed in the fields of physics and social science, any model can be interpreted as a form of the interaction model.

An Ising model is a representative example of the interaction models. In the Ising model, each node takes a binary value such as +1 and −1, and has an energy function represented by a polynomial based on an interaction between nodes and a bias for each node. Examples of a method of searching for a ground state of the Ising model include a method according to a Markov chain Monte Carlo method. In the Markov chain Monte Carlo method, a desired statistic is estimated by sampling the generated states in the stochastic process.

When transforming a real combinatorial optimization problem into a ground state searching problem of the Ising model, two situations that are often difficult to process are encountered. One is a case where variables corresponding to nodes take continuous values. In this case, the number of variables increases since the continuous variables should be approximately represented by multiple binary variables in the Ising model. The other is a case where a high-order interaction (an interaction relation represented as of polynomial of a third or higher order) appears. Although parallelizable Markov chain Monte Carlo method with high efficiency has been proposed for the Ising model of second-order interactions, the number of auxiliary variables increases by reducing the higher-order interaction to the second-order interaction. Further, an interaction coefficient increases, and the ground state search becomes difficult.

The present invention has been made in view of such a background, and an object thereof is to provide an optimization method and an information processing method capable of efficiently performing a ground state search for an interaction model having a continuous variable or a high-order interaction relation.

A preferred aspect of the present invention is an optimization method including executing a ground state search for an interaction model by a ground state search in a surrogate interaction model including D (D is a natural number of three or more) variable groups each having N continuous variables by using an information processing apparatus, the interaction model having a third-order or higher-order energy function including N (N is a natural number) continuous variables and discrete variables. The ground state search is executed based on simulated annealing. An interaction relation of the surrogate interaction model has a complete D-partite graph structure. A coupling is set between i-th variable pairs in the respective variable groups of the surrogate interaction model. The information processing apparatus is operated to simultaneously update all variables of one variable group from among the D variable groups when performing a state transition in the surrogate interaction model.

Another preferable aspect of the present invention is an information processing apparatus including: D×N variable memories that respectively store values of variables of N×D groups (N is a natural number and D is a natural number of three or more); a supply line that supplies a selection signal SW for selecting one of the D variable groups and an update method; an interaction coefficient memory that stores an interaction coefficient J indicating a Dth-order interaction acting between the variable groups; and an arithmetic device that calculates a next state of a value of an i-th variable in a d-th variable group when the selection signal SW selects the d-th variable group (d=1 to D) by using, as inputs, the value of the i-th variable in the d-th variable group, values of a plurality of i-th variables of variable groups other than the d-th variable group, and the interaction coefficient J read from the D×N variable memories.

Still another preferable aspect of the present invention is an information processing system using the above-described information processing apparatus configured to search for a ground state of an interaction model having a third-order or higher-order energy function including N continuous variables and N discrete variables, the information processing system including a control device that controls the arithmetic device. The control device includes an interaction coefficient setting unit, a coupling strength calculation unit, a variable value initialization unit, a temperature parameter control unit, an interaction arithmetic execution unit, and a variable reading unit. The interaction coefficient setting unit stores the interaction coefficient J in an interaction coefficient memory. The coupling strength calculation unit sets the coupling strength λ based on the interaction coefficient J and stores the coupling strength λ in the interaction coefficient memory. The variable value initialization unit re-defines a domain of the discrete variable as a continuous value and initializes a value stored in the variable memory. The temperature parameter control unit controls the temperature signal ST. The interaction arithmetic execution unit controls the arithmetic device to execute the ground state search. The variable reading unit reads the value stored in the variable memory which is a result of the ground state search, and returns a definition of a variable re-defined as the continuous value to a discrete value.

In addition, a problem disclosed in the present application and a method of solving the problem will be clarified by the field of 'Description Of The Preferred Embodiments" and the drawings.

According to the present invention, the ground state search can be efficiently performed on the interaction model having the continuous variable or the high-order interaction relation. Other objects, configurations, and effects which have not been described above become apparent from modes for carrying out the invention to be described hereinafter.

DESCRIPTION OF THE PREFERRED EMBODIMENTS

Figure 1:
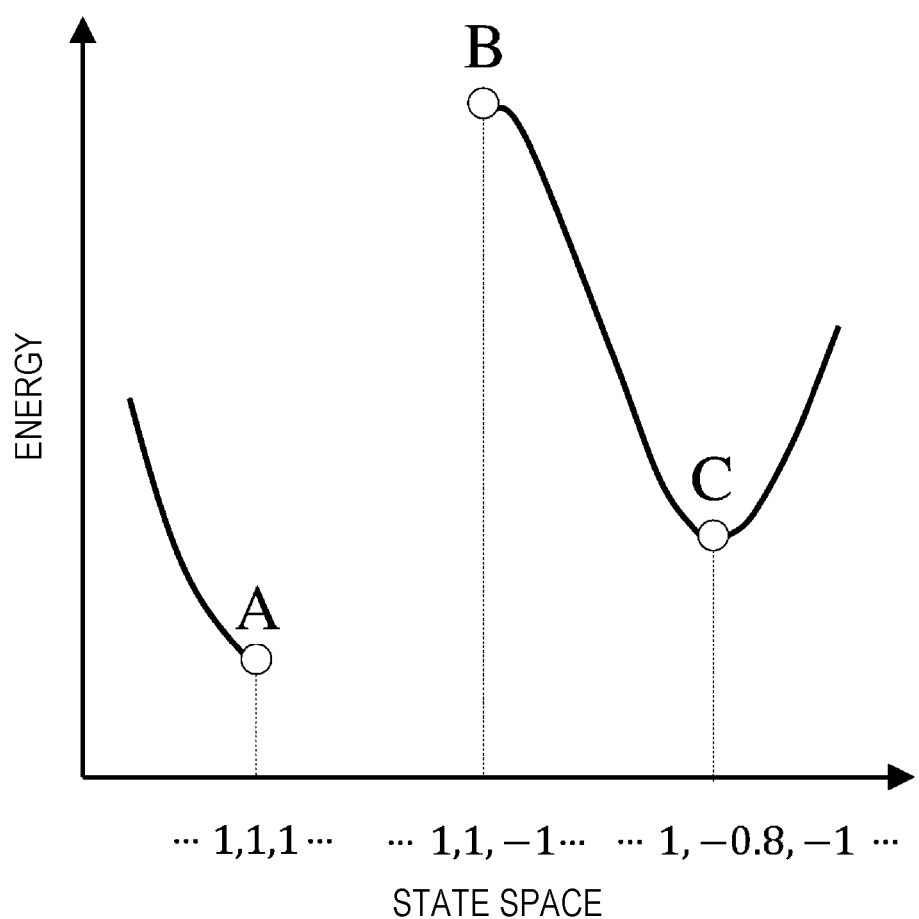
FIG. 1 is a conceptual diagram of an energy landscape of an interaction model.

Hereinafter, an embodiment will be described in detail based on the drawings. In the following description, the same or similar configurations will be denoted by the same reference sign, and redundant descriptions thereof will be sometimes omitted. When there are a plurality of elements having the same or similar functions, the same reference sign will be sometimes described with different subscripts. When it is unnecessary to distinguish between these plural elements, however, the subscripts will be sometimes omitted in the description.

The notations such as "first", "second", and "third" in the present specification and the like are given to identify components, and do not necessarily limit the number, the order, or the content thereof. Further, a number for identifying a component is used for each context, and a number used in one context does not necessarily indicate the same configuration in another context. Further, a component identified by a certain number is not prevented from also serving a function as a component identified by another number.

The publications, patents, and patent applications cited in the present specification constitute a part of the description of the present specification as they are.

Components expressed by the singular in the present specification are intended to include the plural unless clearly indicated in the context.

An example of the embodiment to be described below is an optimization method of performing a ground state search of an interaction model using an information processing apparatus. In this method, the ground state search for the interaction model having a Dth-order (D≥3) interaction is replaced with a ground state search for an interaction model having an interaction relation in which a connection between variables has a complete D-part graph structure. A storage unit, which stores an energy function of the interaction model, and an execution unit, which searches for a ground state of the interaction model based on the energy function and information on the variables, are provided.

Prior to the present application, the inventors of the present invention have proposed an international application PCT JP 2020/029336 related to a ground state search of an Ising model having a high-order interaction, an international application PCT JP 2020/018203 related to a mixed binary quadratic optimization problem, and the like.

First, an interaction model will be described. The interaction model is defined by a plurality of nodes constituting the model, an interaction relation between nodes, and a bias for each node. Here, it is assumed that a variable $s_i$ corresponding to each node i (i=1 to N) is a continuous variable $s_i \in [-1, 1]$ or a discrete variable $s_i \in \{-1, 1\}$. An energy function H(s)(generally referred to as a Hamiltonian) is defined based on the interaction relation and a bias of the interaction model. For example, in a case where an interaction relation is limited to only between two nodes i and j, an energy function is the following quadratic expression.

[Formula 1]

$$H(s) = -\frac{1}{2}\sum_{i,j} J_{ij} s_i s_j - \sum_i h_i s_i \qquad \text{(Expression 1)}$$

The first term of Expression 1 represents the interaction relation, and the second term represents the energy function based on the bias. As the interaction relation, a relation across two or more nodes is also considered. For example, an interaction relation across three nodes i, j, and k is an energy function of the following cubic expression.

[Formula 2]

$$H(s) = -\frac{1}{6} \Sigma_{i,j,k} J_{ijk} s_i s_j s_k \qquad \text{(Expression 2)}$$

In general, an interaction model is represented as an undirected graph, and each interaction term is specified by a set of variables included therein. Therefore, $J_{ij}$ in Expression 1 and $J_{ijk}$ in Expression 2 are symmetric tensors that do not change values with respect to substitution of subscripts.

The above interaction model is a concept including an Ising model. When all variables are limited to the discrete value $s_i \in \{-1, 1\}$ in the interaction model, the Ising model is obtained. The Ising model is used, for example, as a lattice model that describes a magnetic body in statistical mechanics, and +1 and −1 correspond to up and down of a spin.

The ground state search of the interaction model is an optimization problem for obtaining a variable array $\{s_i\}$ that minimizes the energy function. In the present embodiment, the ground state search of the interaction model is performed by Markov Chain Monte Carlo methods (hereinafter, referred to as MCMC).

FIG. 1 is a conceptual diagram of an energy landscape of the interaction model. A horizontal axis of the graph represents a variable array, and a vertical axis represents a total energy of a system. In a stochastic transition, the stochastic transition from a current state s={$s_i$} to another state is repeated. As a method of generating the stochastic transition, there are a heat bath method and a Metropolis method. In particular, when an inverse function $F^{-1}$ is obtained with respect to a cumulative distribution function F(s) in which a value of the i-th variable is a value equal to or less than $s_i$, the state s as a transition destination by the heat bath method is given by the following expression as a uniform random number $r \in [0, 1]$.

[Formula 3]

$$s = F^{-1}(r) \qquad \text{(Expression 3)}$$

As a method of generating the transition destination, a method of updating each variable $s_i$ of the current state s one by one from i=1 to N is typical. For example, in the case of FIG. 1, a discrete variable is inverted from 1 to −1 from the state A to become a state B, and a value of another continuous variable is further updated from 1 to −0.8 to become a state C. Since only 1 and −1 are taken as variables representing a state space from the state A to the state B, the energy changes discontinuously.

While gradually suppressing the transition, the state asymptotically converges to the lowest energy state. Simulated annealing (hereinafter, referred to as SA) is a method of obtaining an optimal solution of a minimization problem by using the above. The parameter T is introduced to control the state transition and referred to as a temperature parameter on the analogy of the actual annealing.

When MCMC or SA is applied to the interaction model, a value of a variable is stochastically updated based on Expression 3 or the like. Here, variables having no interaction relation are independent of each other in the energy function formula and the cumulative distribution function, and it is possible to simultaneously apply the state transition based on Expression 3. Therefore, it is possible to speed up the processing of MCMC or SA by updating the independent variables in parallel.

Figure 2:
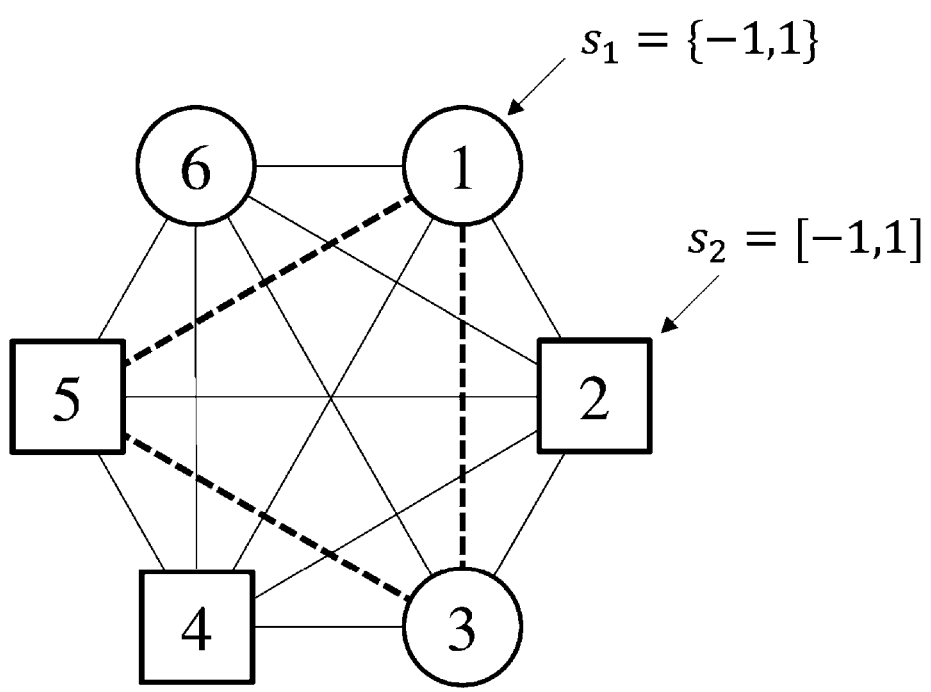
FIG. 2 is a graph illustrating interaction relations among variables of an interaction model as a complete graph.

FIG. 2 is a graph illustrating interaction relations among the variables of the interaction model. The number of variables N is set to six. A round node (1, 3, 6) and a square node (2, 4, 5) correspond to a discrete variable and a continuous variable, respectively. A dotted line represents a third-order interaction including three nodes (1, 3, 5). A complete graph (fully coupled graph) is achieved the interaction relations exist among all the variables. Here, as an example, a value of the third-order interaction is determined from a set of three variables connected by the dotted line. In addition, values of other third-order interactions are determined from other sets of three variables connected by straight lines. Similarly, a Dth-order interaction is determined from D variables.

As described in S. Burer and A. N. Letchford: "Nonconvex mixed-integer nonlinear programming: A survey", Surveys in Operations Research and Management Science 17, 87-106 (2012), many optimization problems in real engineering and industry are formulated as mixed-integer nonlinear programming problems having both continuous variables and discrete variables and having a nonlinear objective function. Further, when these are expressed as an interaction model, an interaction relation between variables becomes a tight coupling as illustrated in FIG. 2 (each variable is combined with many other variables), and thus, the variables are not independent, and it is difficult to simultaneously execute stochastic update of the respective variables. For this reason, it is difficult to speed up the processing of MCMC or SA.

Conversely, it is possible to speed up the processing of MCMC or SA if a plurality of spins can be simultaneously updated while satisfying the theoretical background required by MCMC for the interaction model having the tight interaction relation. In fact, WO 2019/216277 A1 proposes a method of efficiently obtaining a ground state by converting an interaction relation of an Ising model (an interaction model with only discrete variables) having a second-order energy function into a complete bipartite graph structure.

However, in general, if an interaction model is converted into an Ising model by discretizing a continuous variable, the number of variables increases and it becomes difficult to find a solution. Furthermore, it is necessary to reduce the high-order interaction to the second-order interaction in order to apply the method for the Ising model having the second-order interaction as in WO 2019/216277 A1, and many auxiliary variables are required as described in E. Boros and A. Gruber, "On quadratization of pseudo-Boolean functions", International Symposium on Artificial Intelligence and Mathematics (2012). Further, an interaction coefficient increases so that it becomes difficult to search a ground state by SA.

In view of such a background, a description is given in the present embodiment regarding the method of efficiently performing the ground state search based on SA without converting the interaction model having the Dth-order (D≥3) energy function into the Ising model.

First, attention is paid to the discrete variable $s_i \in \{-1, 1\}$ of the interaction model. Since $s_i^2 = 1$ is satisfied for the discrete variable, the energy function is expressed by the following linear expression for the discrete variable $s_i$. Therefore, assuming that an interaction model in which all variables $s_i$ are replaced with continuous variables $x_i \in [-1, 1]$ with respect to the interaction model H(s) is H(x) and ground states of H(s) and H(x) are s* and x*, respectively, the following can be illustrated.

[Formula 4]

$$s_i^* = \begin{cases} \text{sign}(x_i^*) & \text{If } s_i \text{ is a discrete variable} \\ x^* & \text{If } s_i \text{ is a continuous variable} \end{cases} \qquad \text{(Expression 4)}$$

A sign function sign (x) is a function for returning +1 when x≥0 and −1 when x<0. The ground state of H(s) is obtained by searching for the ground state of H(x) by Expression 4.

Next, a bias term and an interaction term equal to or lower than the highest order will be considered. These can be integrated into a higher-order interaction relation by using a spin with a value fixed to 1. For example, assuming $s'_1 = s'_{2=1}$,

[Formula 5]

$$s_1 s_2 s_3 + s_1 s_2 + s_1 = s_1 s_2 s_3 + s'_2 s_1 s_2 + s'_1 s'_2 s_1 \qquad \text{(Expression 5)}$$

or the like is obtained.

Based on the above, the highest order of an interaction of the interaction model is set as D=3, and the interaction model H(x) having only D=third-order interaction term will be considered hereinafter. The expression is as follows.

[Formula 6]

$$H(x) = -\frac{1}{6} \Sigma_{i,j,k} J_{ijk} x_i x_j x_k \qquad \text{(Expression 6)}$$

However, a similar procedure can be performed even when D≥4, and a portion requiring correction will be described later. In correspondence with Expression 6, the following interaction model including auxiliary variables y and z∈ [−1, 1]$^N$ is considered.

[Formula 7]

$$H(x, y, z) = -\frac{1}{6}\Sigma_{i,j,k}J_{ijk}x_iy_jz_k + \frac{\lambda}{2}\{(x_i - y_i)^2 + (y_i - z_i)^2 + (z_i - x_i)^2\}$$ (Expression 7)

Figure 3:
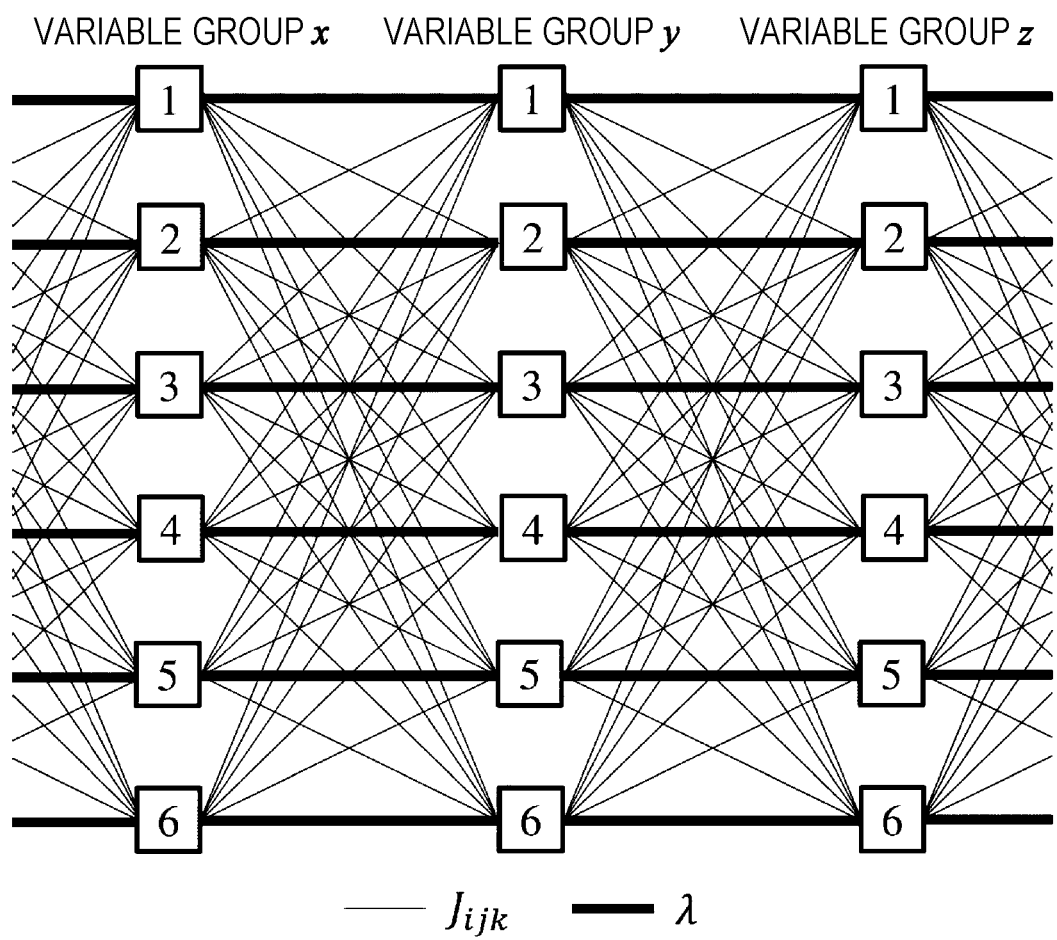
FIG. 3 is a graph illustrating interaction relations among variables in an interaction model having a third-order energy function as a complete tripartite graph structure.

FIG. 3 is a graph illustrating the interaction model of Expression 7. From FIG. 3, it can be seen that an interaction relation of Expression 7 is a complete tripartite graph structure. A first variable group x, a second variable group y, and a third variable group z are referred to in order from the left in FIG. 3. An interaction with a magnitude $J_{ijk}$ acts on $x_i$ of the first variable group, $y_j$ of the second variable group, and $z_k$ of the third variable group. The second term on the right side of Expression 7 acts as a second-order interaction of a coupling λ between i-th (i=1 to N) pairs of the first to third variable group. In FIG. 3, the interaction $J_{ijk}$ is indicated by a thin line, and the coupling λ is indicated by a thick line. Although conveniently terminated in FIG. 3, the third variable group z is coupled with the first variable group x. The second term of Expression 7 can be regarded as a penalty term that is applied when x, y, and z are different values.

Figure 4:
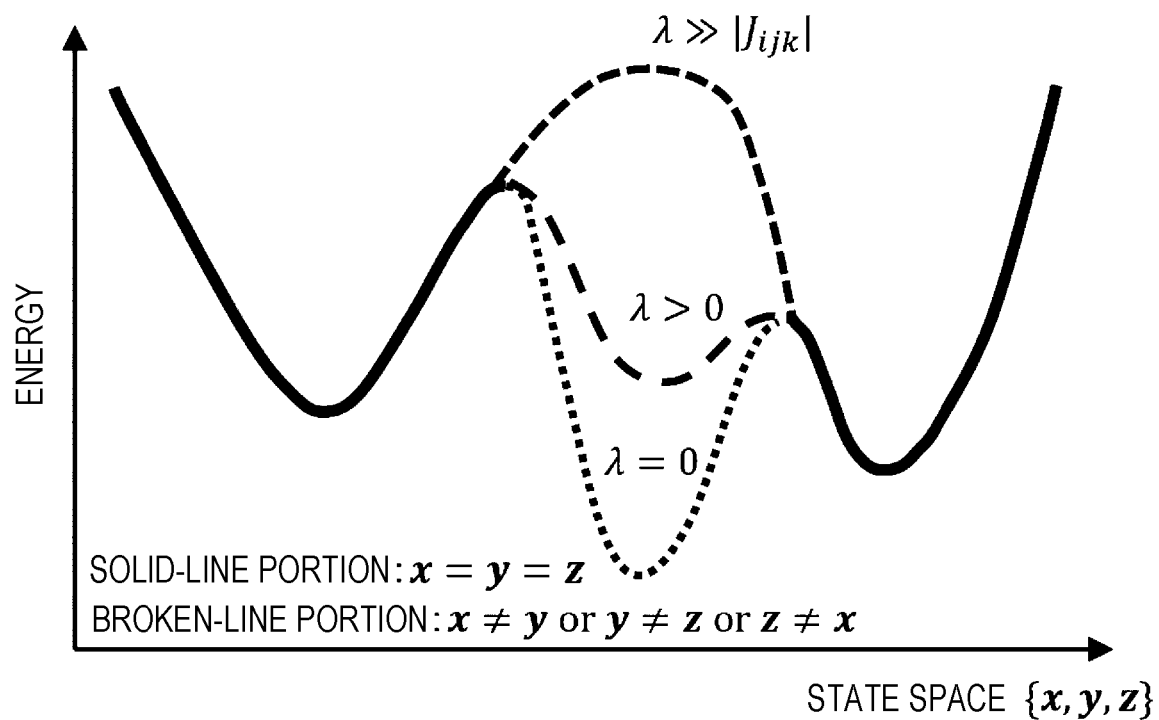
FIG. 4 is a conceptual view illustrating influence of a penalty term having a coupling A on the energy landscape.

FIG. 4 is a conceptual view schematically illustrating the influence of the penalty term having the coupling λ on the energy landscape. In a portion indicated by a solid line, x, y, and z take the same value. In a portion indicated by a broken line, x, y, and z do not take the same value. Thus, the influence of the penalty term appears in the portion indicated by the broken line. When λ=0, the penalty term becomes 0 in Expression 7, and the state with different values of x, y, and z can be the ground state. When λ>0 is set to a sufficiently large value, what minimizes the first term in the range of x=y=z is a ground state of Expression 7. That is, a ground state x*=y*=z* of Expression 7 coincides with a ground state x* of Expression 6.

In fact, it can be proved that the ground states of Expressions 6 and 7 coincide when λ is larger than a certain value. Assuming u ∈ [−1, 1]$^N$, a matrix M(u) in which an element $M_{ij}(u)$ at an i-th row and a j-th column has the following value is defined.

[Formula 8]

$$M_{ij}(u) = \frac{1}{6}\Sigma_k J_{ijk} u_k$$ (Expression 8)

Here, if λ is larger than a maximum value $\lambda_{max}$ that can be taken by an eigenvalue of the matrix M(u) when u is changed, the ground states of Expressions 6 and 7 coincide. Further, several evaluation expressions can be illustrated regarding $\lambda_{max}$.

[Formula 9]

$$\lambda_{max} = \max_{u\in[-1,1]^N, \|v\|_2=1} v^T(\Sigma_k J_k u_k)v \leq$$ (Expression 9)

$$\max_{\|v\|_2=1} \Sigma_k \|J_k v\|_2 \leq \sqrt{N \max_{\|v\|_2=1} v^T \Sigma_k J_k^2 v}$$

Here, a matrix $J_k$ is a matrix in which an element at an i-th row and a j-th column is $J_{ijk}$, and $\|\cdot\|_2$ is an L2 norm of a vector. The second expression on the right side can be solved as a constrained optimization problem. Further, the third expression on the right side is equivalent to a largest eigenvalue problem and can be calculated by a multiplication method.

Therefore, a ground state search of Expression 6 can be executed by setting appropriate λ and performing a ground state search of Expression 7. An important point is that Expression 7 has the interaction relation having the complete tripartite graph structure illustrated in FIG. 3. That is, different variables inside a variable group have no interaction relation and are independent of each other. Therefore, when MCMC or SA is executed, the variable groups x, y, and z can be updated simultaneously, and the efficiency can be improved by parallel processing. Therefore, the ground state of the original interaction model is searched for by searching for the ground state of Expression 7 based on SA in the present embodiment. Note that the influence of the penalty term becomes excessive if λ is too large, and thus, it is preferable to provide an appropriate upper limit for A. The upper limit of λ can be determined according to a purpose or an application of a problem to be solved. It is desirable that the i-th variables of the respective variable groups have the same value in the ground state by the coupling A.

The above discussion is also applicable to D≥4. For example, in the case of D=4, expressions corresponding to Expression 6 and Expression 7 are as follows.

[Formula 10]

$$H(x) = -\frac{1}{24}\Sigma_{i,j,k,l}J_{ijkl}x_ix_jx_kx_l$$ (Expression 10)

[Formula 11]

$$H(x, y, z, w) = \\ -\frac{1}{24}\Sigma_{i,j,k,l}J_{ijkl}x_iy_jz_kw_l + \frac{\lambda}{2}\Sigma_i\{(x_i - y_i)^2 + (x_i - z_i)^2 + (x_i - w_i)^2 + (y_i - z_i)^2 + (y_i - w_i)^2 + (z_i - w_i)^2\}$$ (Expression 11)

In particular, when λ is larger than a maximum eigenvalue Amax of the next matrix M(u, u') in Expression 11, it can be illustrated that ground states of Expression 10 and Expression 11 coincide.

[Formula 12]

$$M_{ij}(u, u') = \frac{1}{24}\sum_{k,l} J_{ijkl}\, u_k\, u_l$$ (Expression 12)

Here, u, u'∈ [−1, 1]$^N$. Similarly, even in the case of the higher order, a ground state search problem of an original interaction problem can be transformed to the ground state search of the interaction model having the interaction relation of the complete D-part graph structure and the coupling λ if the coupling λ is sufficiently large.

Next, a method of transitioning a state based on a heat bath method with respect to Expression 7 will be described. As the temperature parameter T, it is assumed that a state {x, y, z} of the interaction model of Expression 7 appears with a probability p(x, y, z) based on the Boltzmann distribution.

[Formula 13]

$$p(x, y, z) = \frac{1}{Z}\exp\left(-\frac{H(x, y, z)}{T}\right) \quad \text{(Expression 13)}$$

Here, Z is a normalization factor of the Boltzmann distribution that is called a distribution function. At this time, when y and z are given, a conditional cumulative distribution function $F(x_i|\sigma, y)$ of $x_i$ can be expressed by the following expression.

[Formula 14]

$$F(x_i \mid y, z) \propto f(x_i) - f(-1),$$

$$f(x_i) = \text{erf}\left(\sqrt{\frac{\lambda}{T}}\left(x_i - \frac{\lambda(y_i + z_i) + \frac{1}{6}\Sigma_{jk}J_{ijk}y_jz_k}{2\lambda}\right)\right) \quad \text{(Expression 14)}$$

Here, erf(x) is an error function. Therefore, a transition destination can be obtained from Expression 3 as a uniform random number r∈ [0, 1].

[Formula 15]

$$x_i \leftarrow \frac{\lambda(y_i + z_i) + \frac{1}{6}\Sigma_{jk}J_{ijk}y_jz_k}{2\lambda} + \sqrt{\frac{T}{\lambda}}\text{erf}^{-1}(r\,f(1) + (1-r)f(-1)) \quad \text{(Expression 15)}$$

Similarly, a transition destination of $y_i(z_i)$ in a case where z and x (x, y) are given is expressed by substituting variables with Expression 15.

Figure 5:
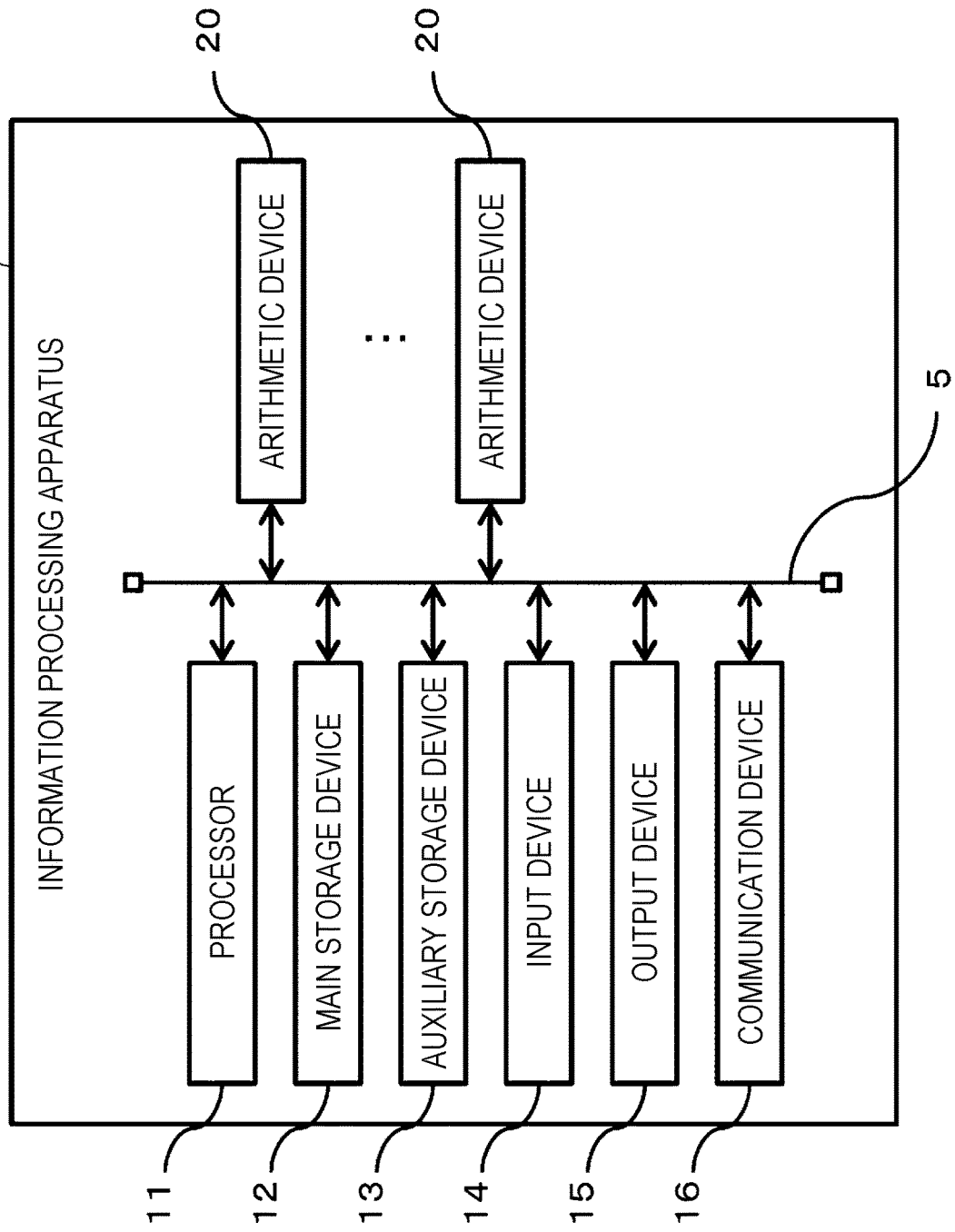
FIG. 5 is a block diagram illustrating a schematic configuration of an information processing apparatus.

Next, an example of an embodiment of an information processing apparatus that performs a ground state search based on Expression 15 will be described. An information processing apparatus 10 illustrated in FIG. 5 includes a processor 11, a main storage device 12, an auxiliary storage device 13, an input device 14, an output device 15, a communication device 16, one or more arithmetic devices 20, and a system bus 5 that connects these devices to be capable of communicating with each other. For example, a part or whole of the information processing apparatus 10 may be realized using a virtual information processing resource such as a cloud server provided by a cloud system. Further, the information processing apparatus 10 may be realized by, for example, a plurality of information processing apparatuses that operate in cooperation with each other and are connected to be capable of communicating with each other.

The processor 11 is configured using, for example, a central processing unit (CPU) or a micro processing unit (MPU). The main storage device 12 is a device that stores a program and data, and is, for example, a read only memory (ROM)(such as a static random access memory (SRAM)), a non-volatile RAM (NVRAM), a mask read-only memory (ROM), and a programmable ROM (PROM)) a random access memory (RAM) (such as a dynamic random access memory (DRAM)), or the like. The auxiliary storage device 13 is a hard disk drive, a flash memory, a solid state drive (SSD), an optical storage device (such as a compact disc (CD) and a digital versatile disc (DVD)), or the like. A program and data stored in the auxiliary storage device 13 are read into the main storage device 12 as needed.

The input device 14 is a user interface that receives an input of information from a user, and is, for example, a keyboard, a mouse, a card reader, a touch panel, or the like. The output device 15 is a user interface that provides information to the user, and is, for example, a display device that visualizes various types of information (such as a liquid crystal display (LCD) and a graphic card), a voice output device (speaker), a printing device, or the like. The communication device 16 is a communication interface that communicates with another device, and is, for example, a network interface card (NIC), a wireless communication module, a universal serial interface (USB) module, a serial communication module, or the like.

The arithmetic device 20 is a device that executes a ground state search. The arithmetic device 20 may take a form of an extension card attached to the information processing apparatus 10 like a graphics processing unit (GPU), for example. The arithmetic device 20 is configured using hardware, for example, a complementary metal oxide semiconductor (CMOS) circuit, a field programmable gate array (FPGA), an application specific integrated circuit (ASIC), or the like. The arithmetic device 20 includes a control device, a storage device, an interface for connection with the system bus 5, and the like, and transmits and receives a command and information to and from the processor 11 via the system bus 5. For example, the arithmetic device 20 may be connected to the other arithmetic device 20 via a communication line, for example, to be capable of communicating with each other and operate in cooperation with the other arithmetic device 20. A function realized by the arithmetic device 20 may be realized, for example, by causing a processor (a CPU, a GPU, or the like) to execute a program.

Figure 6:
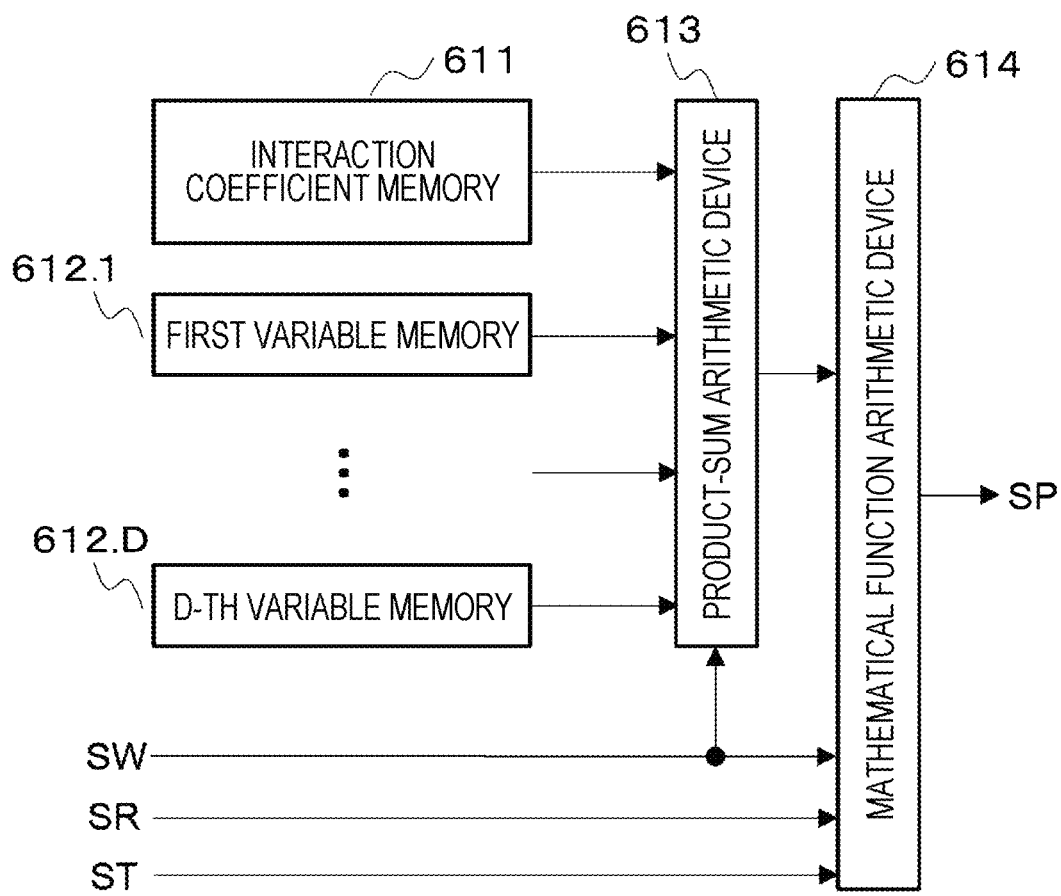
FIG. 6 is a block diagram of an arithmetic circuit forming the arithmetic device.

FIG. 6 is a diagram for describing an operation principle of the arithmetic device 20, and is a block diagram of an arithmetic circuit forming the arithmetic device 20. The arithmetic device 20 realizes the function corresponding to Expression 15. Hereinafter, the operation principle of the arithmetic device 20 will be described with reference to FIG. 6. In the following description, the order of an energy function of an interaction model handled by the arithmetic device 20 is represented by D, and the number of variables is represented by N.

As illustrated in FIG. 6, the arithmetic device 20 includes an interaction coefficient memory 611, a d-th variable memory 612.*d* (d=1 to D), a product-sum arithmetic device 613, and a mathematical function arithmetic device 614.

The interaction coefficient memory 611 stores information representing an interaction tensor J. Since the interaction tensors are symmetric tensors as described above, the usage of the memory 611 can be reduced by using this symmetry. Further, information indicating the coupling λ is also stored.

The d-th variable memory 612.$d$ (d=1 to D) stores information of an N-dimensional vector indicating a state of a d-th variable group of the above-described complete D-part graph structure. For example, in the case of D=3, x, y, and z in FIG. 3 correspond to the first variable group, the second variable group, and the third variable group, respectively.

Signals SW, SR, and ST are input to the arithmetic device 20. The mathematical function arithmetic device 614 outputs a signal SP.

The signal SW is a signal that periodically repeats integers 1 to D, and specifies the correspondence between a variable and a variable memory in Expression 15.

The signal SR is a signal representing the N-dimensional vector in which elements are random numbers independent from each other. As the signal SR, r in Expression 15 is input.

As the signal ST, the temperature parameter T in Expression 15 is input.

As described above, the coupling $\lambda$ is set as a sufficiently large value based on the interaction tensor J. A numerical evaluation based on Expression 9 may be performed outside the arithmetic device 20, for example, by the processor 11. Further, calculation can be performed inside the arithmetic device 20. For example, in a case where a maximum eigenvalue is calculated by a power method or the like, the matrix-vector product is repeatedly executed, and the product-sum arithmetic device 613 can be utilized.

The contents of the interaction coefficient memory 611 and the d-th variable memory 612.$d$ (d=1 to D) and the signal SW are input to the product-sum arithmetic device 613. Expression 15 includes a product-sum operation of the interaction tensor J and a vector, and the operation is executed under a correspondence relation of variables specified by the signal SW and outputs the resultant. For example, the next state of the variable x is calculated in Expression 15, and thus, the other variables y and z are used.

Expression 15 includes an operation of an error function or an inverse error function with respect to a scalar such as the output of the product-sum operation and the uniform random number r, which is executed by the mathematical function arithmetic device 614. The signal SW specifies any expression corresponding to the operation to be executed. Further, the uniform random number r and the temperature parameter T are input from the signal SR and the signal ST, respectively. A value of the next state of the variable updated according to MCMC, which is the output value, is output to the signal SP.

Since Expression 15 is independent of a subscript i (i=1 to N), the operation of the arithmetic device 20 can also be executed independently of the subscript i. That is, the speed-up of MCMC is realized by executing the plurality of arithmetic devices 20 in parallel.

Figure 7:
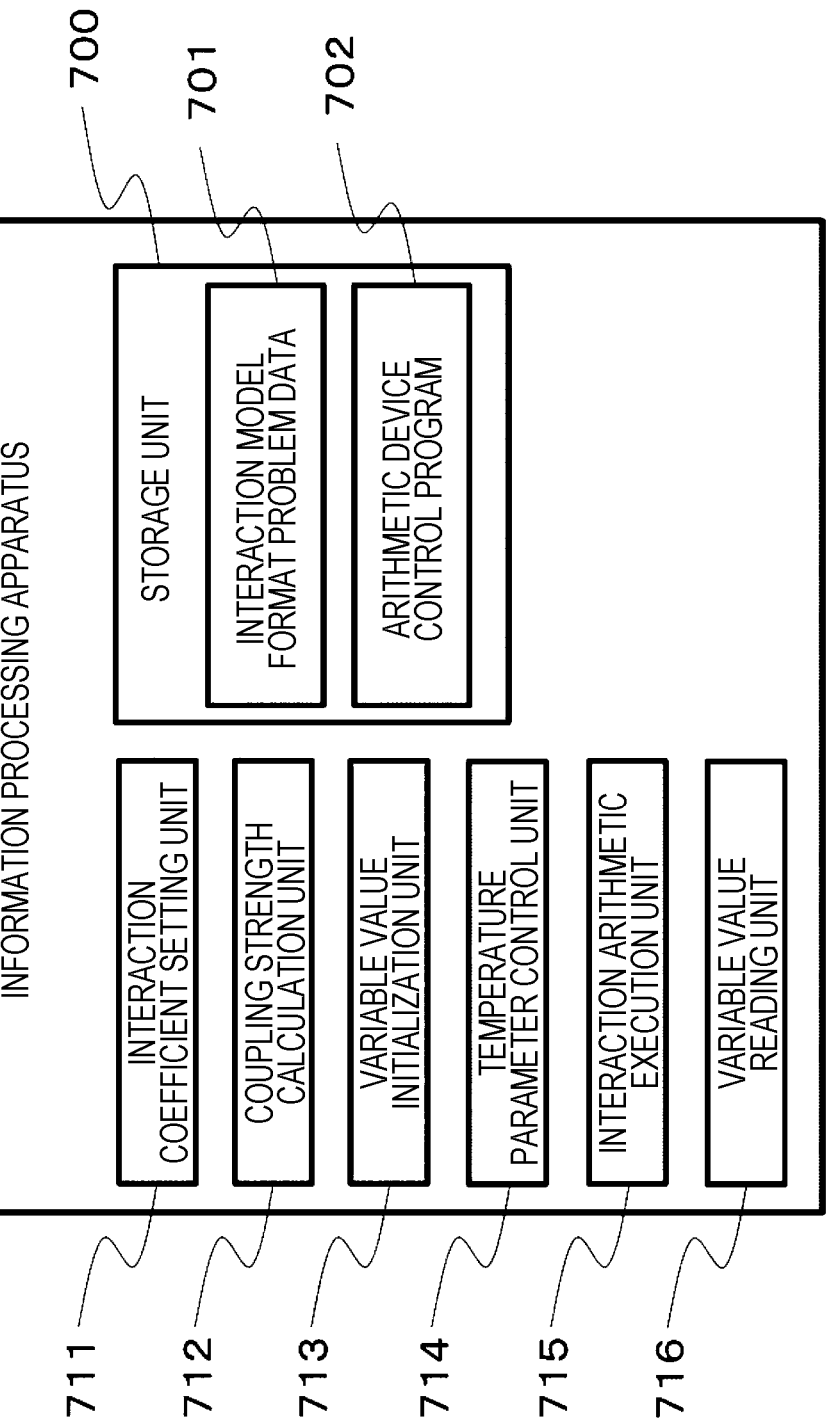
FIG. 7 is a functional block diagram illustrating main functions of the information processing apparatus.

FIG. 7 illustrates main functions (software configurations) of the information processing apparatus 10. The information processing apparatus 10 is a so-called Neumann computer that stores programs as data in a storage device and sequentially reads and executes the programs. As illustrated in FIG. 7, the information processing apparatus 10 includes a storage unit 700, an interaction coefficient setting unit 711, a coupling strength calculation unit 712, a variable value initialization unit 713, a temperature parameter control unit 714, an interaction arithmetic execution unit 715, and a variable value reading unit 716. These functions are implemented by the processor 11 reading and executing programs stored in the main storage device 12 or by hardware included in the arithmetic device 20. Note that the information processing apparatus 10 may include other functions such as an operating system, a file system, a device driver, and a database management system (DBMS), in addition to the above-described functions.

Among the above functions, the storage unit 700 stores an interaction model format problem data 701 and an arithmetic device control program 702 in the main storage device 12 or the auxiliary storage device 13. The interaction model format problem data 701 is data in which a combinatorial optimization problem is input in a predetermined description format. A user sets the interaction model format problem data 701 via a user interface (input device, output device, communication device, or the like), for example. The arithmetic device control program 702 is a program that is executed when the interaction arithmetic execution unit 715 controls the arithmetic device 20, or is loaded by the interaction arithmetic execution unit 715 into each of the arithmetic devices 20 and executed by the arithmetic device 20.

The interaction coefficient setting unit 711 sets the interaction tensor J in the interaction coefficient memory 611 based on the interaction model format problem data 701.

The coupling strength calculation unit 712 calculates a value of the coupling $\lambda$ in Expression 15 based on Expression 9 with reference to the interaction coefficient memory 611.

The variable value initialization unit 713 initializes a value stored in variable memory 612.$d$ (d=1 to D) of arithmetic device 20. For example, a uniform random number of −1 to +1 is set.

The temperature parameter control unit 714 controls the temperature parameter T in Expression 15.

The interaction arithmetic execution unit 715 performs a ground state search (hereinafter, referred to as an interaction operation) according to SA on the interaction model according to Expression 15.

When SA is executed by the interaction arithmetic execution unit 715, the variable value reading unit 716 reads a value stored in the variable memory 612.$d$ (d=1 to D) and outputs the read value to the output device 15 or the communication device 16, thereby ending the ground state search.

Figure 8:
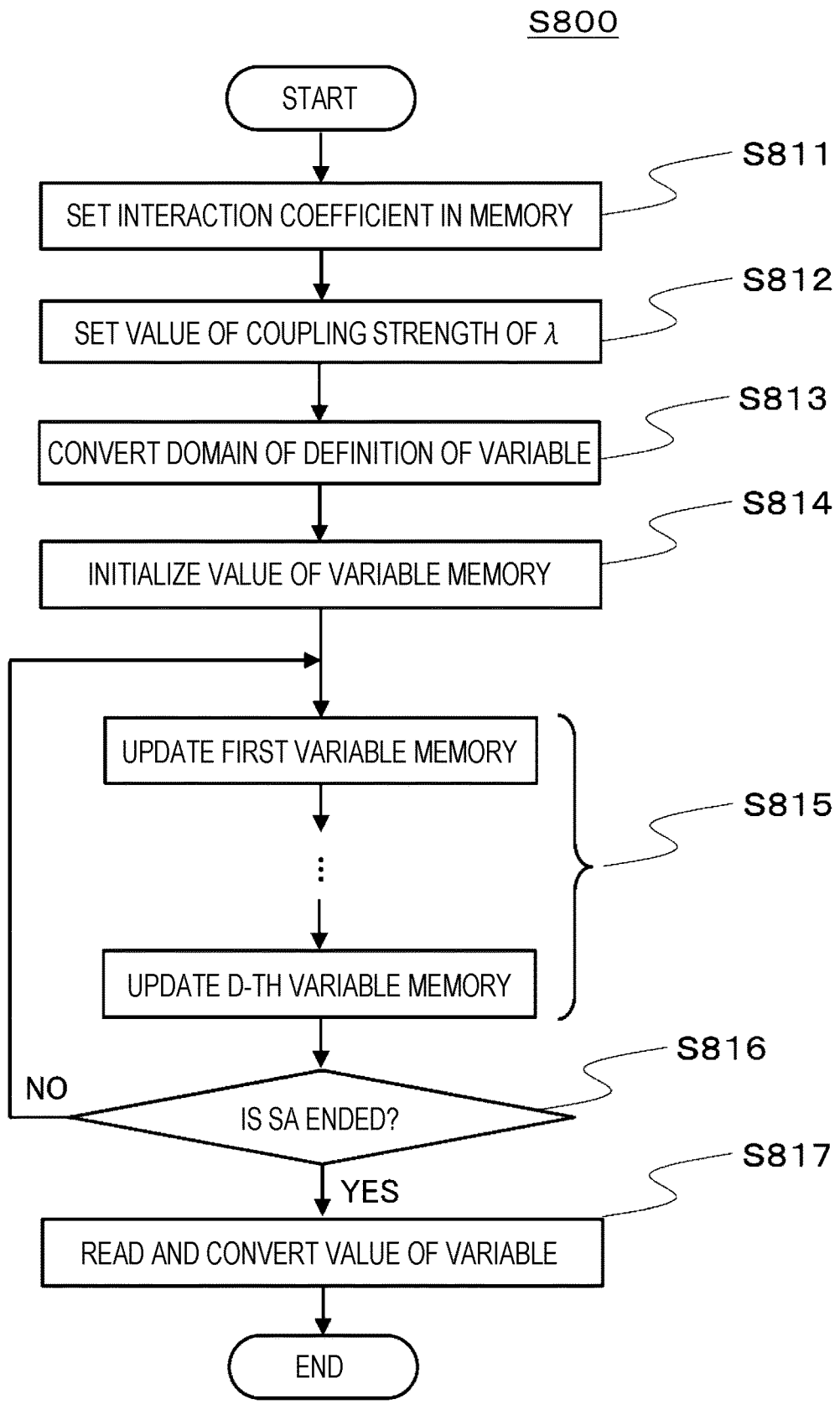
FIG. 8 is a flowchart for describing a ground state search process.

FIG. 8 is a flowchart illustrating processing (hereinafter, referred to as ground state search processing S800) performed by the information processing apparatus 10 during the ground state search of the interaction model. Hereinafter, the ground state search processing S800 will be described together with FIG. 8. In the following description, the letter "S" added in front of a reference sign means a processing step. The ground state search processing S800 is started by receiving an instruction or the like from the user via the input device 14, for example.

First, the interaction coefficient setting unit 711 sets the value J in the interaction coefficient memory 611 (S811). The value of the memory can also be set or edited by the user via a user interface (which is realized by the input device 14, the output device 15, the communication device 16, and the like, for example).

Subsequently, the coupling strength calculation unit 712 sets the coupling $\lambda$ based on the interaction tensor J stored in the interaction coefficient memory 611 and stores the coupling $\lambda$ in the interaction coefficient memory 611. As described above, this calculation may be executed in the arithmetic device 20 or by the processor 11 (S812).

When variables of an interaction model include a continuous value and a discrete value, the discrete value is temporarily treated as a continuous value. The variable value initialization unit 713 re-defines a domain of definition of a variable having a discrete value as a continuous value (S813).

Subsequently, the variable value initialization unit 713 initializes the value stored in the variable memory 612.$d$ ($d$=1 to D)(S814).

Subsequently, the interaction arithmetic execution unit 715 executes an interaction operation based on Expression 15 to update the value of the variable memory 612.$d$ ($d$=1 to D)(S815).

Subsequently, the interaction arithmetic execution unit 715 determines whether an SA end condition is satisfied (for example, whether state update has been executed while changing the temperature parameter T a predetermined number of times)(S816). When the interaction arithmetic execution unit 615 determines that the SA end condition is satisfied (S816: YES), the processing proceeds to S817. On the other hand, when the interaction arithmetic execution unit 715 determines that the stop condition is not satisfied (S816: NO), the processing returns to S815.

Subsequently, the variable value reading unit 716 reads the value stored in the variable memory 612.$d$ ($d$=1 to D), and returns the definition of the variable, which has been converted into the continuous value in S813, to the discrete value. At this time, the conversion from the continuous value to the discrete value is performed according to Expression 4. The changed variable is stored as a result of the ground state search (S817), and the ground state search processing S800 ends.

Figure 9:
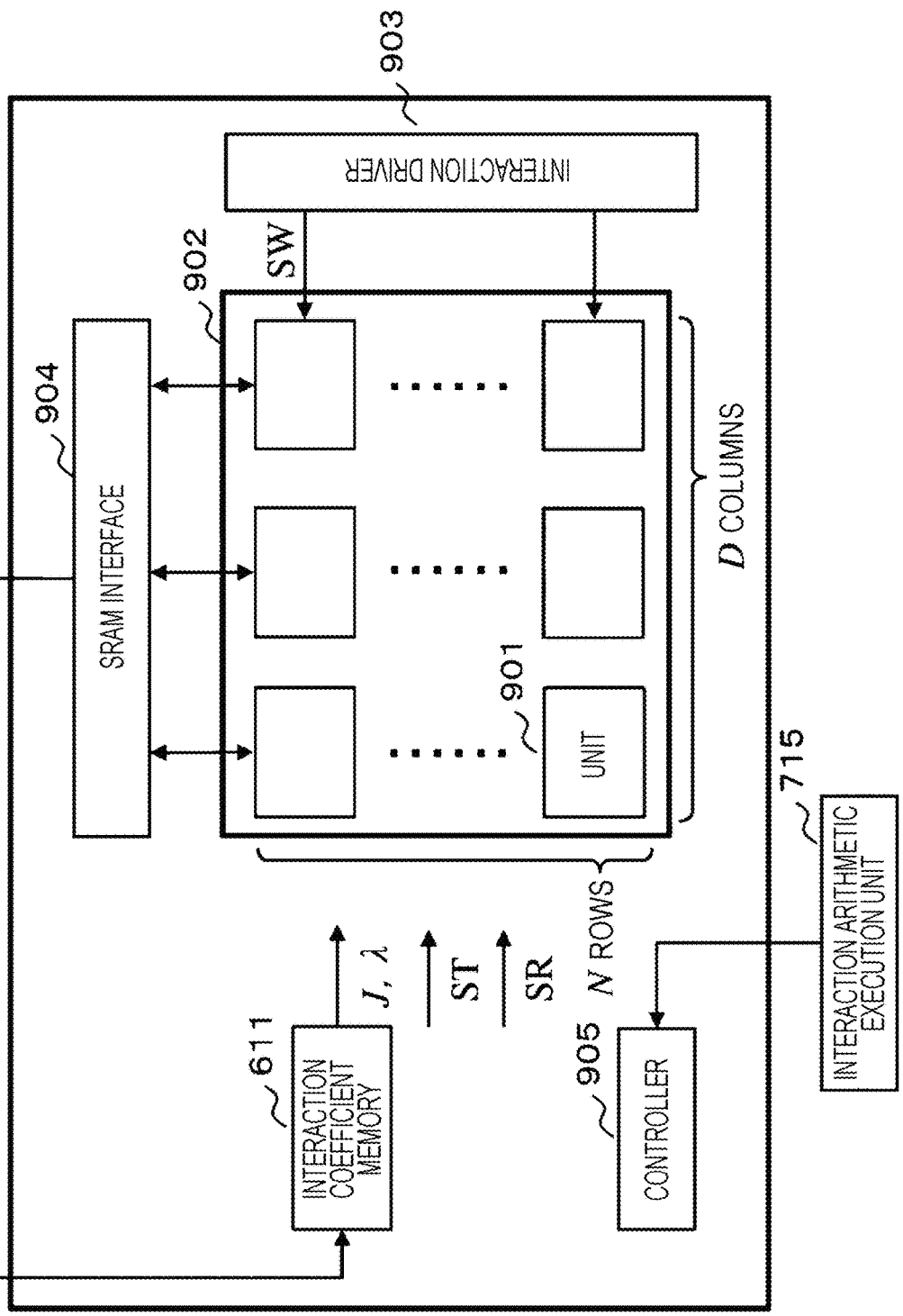
FIG. 9 is a block diagram illustrating a detailed configuration example of an arithmetic device.

FIG. 9 is a block diagram illustrating a detailed configuration example of the arithmetic device 20, and is a block diagram illustrating a circuit configuration example in a case where an SRAM technology is applied to the arithmetic device 20 of the present embodiment. A plurality of units 901 constitute a unit array 902. Such a configuration (hardware) can be manufactured by applying a semiconductor manufacturing technology.

Figure 10:
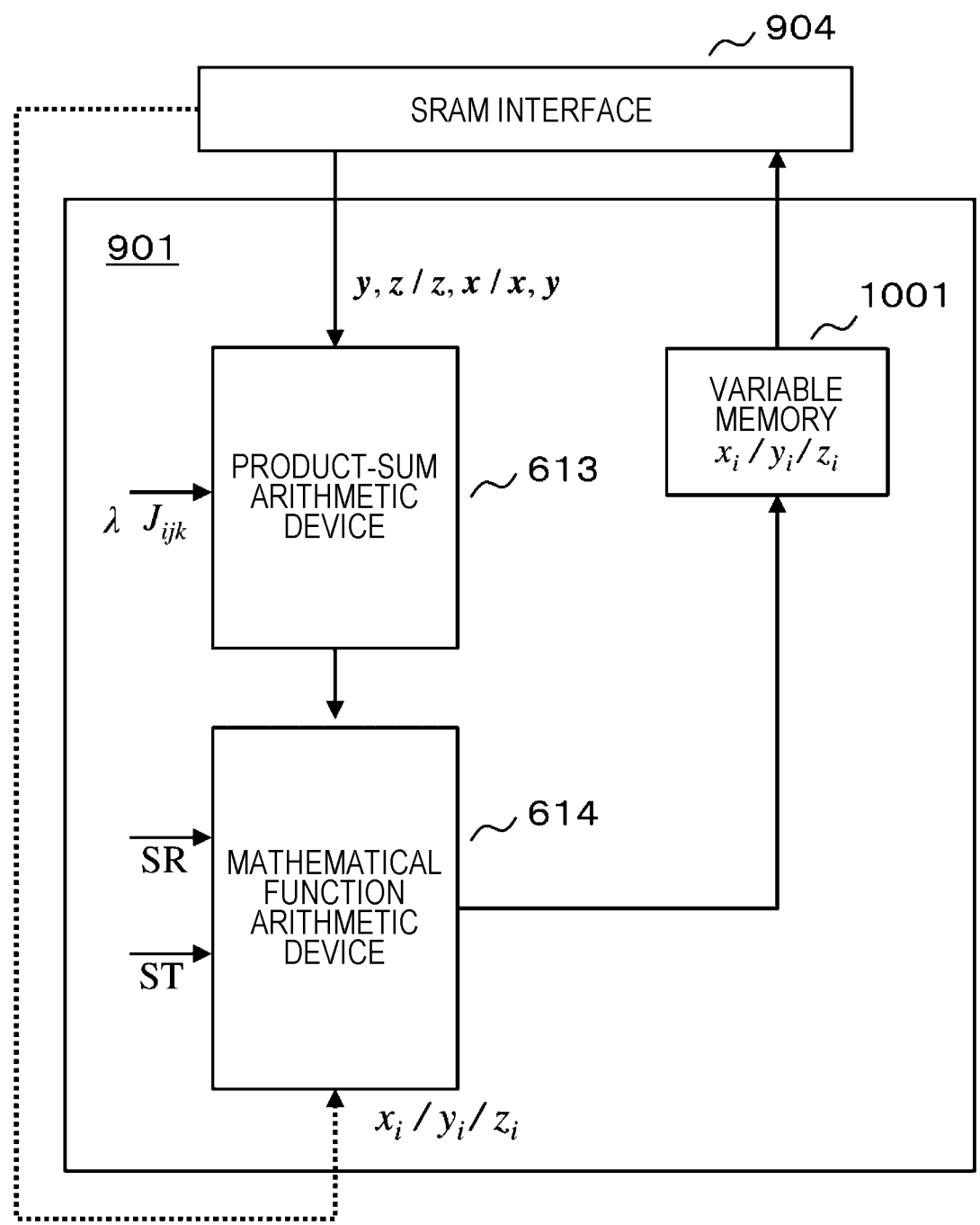
FIG. 10 is a block diagram illustrating a circuit configuration example of one unit.

FIG. 10 is a circuit configuration example of the single unit 901 corresponding to a node. The single unit 901 includes a variable memory 1001 that stores one variable and a configuration for updating a value of the variable memory 1001 which will be described later. That is, D×N units 901 are prepared, and parallel operations can be performed for each variable group. In FIG. 10, variables in the case of D=3 corresponding to FIG. 3 are described.

A configuration example of FIG. 9 will be described with reference to a generalized configuration of FIG. 6. Data stored in the interaction coefficient memory 611 is set from the interaction coefficient setting unit 711. The interaction coefficient memory 611 stores the interaction tensor J and the coupling λ, which are commonly used by all the units 901 in order to reduce the circuit scale. Thus, the interaction coefficient memory 611 supplies the coefficient J and the coupling λ to all the units 901, but signal lines for the supply are omitted in FIG. 9. In principle, each of the units 901 may individually include the interaction coefficient memory 611.

As described with reference to FIG. 3, an interaction driver 903 selects one group from the d-th variable group, and inputs the signal SW permitting the update to each of the units 901. As a result, only one specific group is updated simultaneously.

An SRAM interface 904 performs write and read with respect to the variable memory 1001 that stores the variables of the unit 901 created by applying the circuit configuration of SRAM. A value of a variable read after end of processing in the arithmetic device 20 is sent to the variable value reading unit 716. The variable value reading unit 716 appropriately stores and outputs the read value to output a result of ground state search.

A controller 905 performs initialization of the arithmetic device 20 and a processing end report in accordance with an instruction from the interaction arithmetic execution unit 715.

FIG. 10 is a diagram illustrating the circuit configuration example of the single unit 901. The single unit includes the variable memory 1001 that stores any one of N variables included in the D variable groups.

The product-sum arithmetic device 613 receives values of a variable group to which the variable memory does not belong. These variable vectors are generated by being read from the variable memories 1001 of the other units 901 by the SRAM interface 904. Further, a value of the interaction coefficient J stored in the interaction coefficient memory 611 is input.

The output of the product-sum arithmetic device 613, the signal ST, and the signal SR are input to the mathematical function arithmetic device 614. Then, the next state of the variable is output based on Expression 15 and stored in the variable memory 1001.

As described above in detail, the ground state search based on SA of the interaction model can be efficiently performed according to the information processing apparatus 10 of the present embodiment. Note that the information processing apparatus 10 (including the arithmetic device 20) has a simple configuration, and thus, can be manufactured inexpensively and easily.

An information processing apparatus according to an embodiment substitutes a ground state search for an interaction model having a Dth-order (D≥3) energy function by a ground state search in an interaction model having an interaction relation in which a connection between variables has a complete D-part graph structure, stores the energy function of the interaction model, updates the variables according to simulated annealing based on the energy function and information of the variables, and searches for a ground state. As a result, the ground state search of the interaction model having the discrete variable or the continuous variable and having the high-order energy function can be efficiently performed.

Although one embodiment has been described as above, the present invention is not limited to the above-described embodiment, and, of course, can be modified in various ways within a scope not departing from a gist thereof For example, the above-described embodiment has been described in detail in order to describe the present invention in an easily understandable manner, and are not necessarily limited to one including the entire configuration that has been described above. Further, addition, deletion or substitution of other configurations can be made with respect to some configurations of the above-described embodiment.

Further, a part or all of each of the above-described configurations, functions, processing units, processing means, and the like may be realized by hardware, for example, designed with an integrated circuit and the like. Further, the above-described respective configurations, functions and the like may be realized by software by the processor interpreting and executing a program for realizing the respective functions. Information such as programs, tables, and files that realize the respective functions can be installed in a storage device such as a memory, a hard disk, and a solid state drive (SSD), or a storage medium such as an IC card, an SD card, and a DVD.

Further, in the above-described respective drawings, control lines and information lines considered to be necessary for the description have been illustrated, and it is difficult to say that all of the control lines and information lines required for implementation are illustrated. For example, it may be considered that most of the configurations are practically connected to each other.

Further, an arrangement form of various functional units, various processing units, and various databases of the information processing apparatus 10 described above are merely examples. The arrangement form of the various functional units, the various processing units, and the various databases can be changed to an optimal arrangement form from the viewpoint of performance, processing efficiency, communication efficiency, or the like of hardware and software included in the information processing apparatus 10.

Further, a configuration (schema or the like) of a database that stores various data described above can be flexibly changed from the viewpoint of efficient use of resources, improvement in processing efficiency, improvement in access efficiency, improvement in search efficiency, or the like.

The present invention can be used for an optimization method and an information processing apparatus.

What is claimed is:

1. An optimization method comprising
executing a ground state search for an interaction model by a ground state search in a surrogate interaction model including D (D is a natural number of three or more) variable groups each having N continuous variables by using an information processing apparatus, the interaction model having a third-order or higher-order energy function including N (N is a natural number) continuous variables and discrete variables,
wherein the ground state search is executed based on simulated annealing,
an interaction relation of the surrogate interaction model has a complete D-part graph structure,
a coupling is set between i-th variable pairs in the respective variable groups of the surrogate interaction model, and
the information processing apparatus is operated to simultaneously update all variables of one variable group from among the D variable groups when performing a state transition in the surrogate interaction model,
wherein the information processing apparatus includes:
D memory groups each of which includes N variable memories that store values of the N continuous variables;
a supply line which supplies a selection signal SW for selecting one of the variable groups and selecting the memory group and an update method when a value is updated;
a value of the selected memory group is updated by the selection signal SW according to the selected update method; and
an interaction coefficient memory that stores an interaction coefficient J that defines the interaction relation of the surrogate interaction model and coupling strength $\lambda$ between the i-th variable pairs in the respective variable groups, and
wherein the information processing apparatus calculates a next state of the value of the memory group from the interaction coefficient J, the coupling strength $\lambda$, the variable memory, a temperature signal ST, and a random number signal SR, and
wherein the following equation is satisfied:

$$H(x, y, z) = -\frac{1}{6}\sum_{i,j,k} J_{ijk} x_i y_j z_k + \frac{\lambda}{2} \sum_i \left\{(x_i - y_i)^2 + (y_i - z_i)^2 + (z_i - x_i)^2\right\},$$

where x is a first variable group, y is a second variable group, and z is a third variable group and an interaction with a magnitude $J_{ijk}$ acts on $x_i$ of the first variable group, $y_j$ of the second variable group, and $z_k$ of the third variable group.

2. The optimization method according to claim 1, wherein the coupling strength $\lambda$ affects a magnitude of a penalty in a case where the i-th variable pairs of the respective variable groups have different values with respect to the energy function.

3. The optimization method according to claim 1, wherein the interaction coefficient J is a symmetric tensor, and the coupling strength $\lambda$ is determined from a numerical evaluation based on J.

4. The optimization method according to claim 1, wherein an acceptance probability P of a state transition to the next state is obtained based on a heat bath method in an algorithm of the simulated annealing.

* * * * *